Oct. 27, 1953 — R. G. PIETY — 2,657,373
APPARATUS FOR SEISMIC EXPLORATION
Filed Sept. 6, 1949

INVENTOR.
R. G. PIETY
BY Hudson & Young
ATTORNEY

Patented Oct. 27, 1953

2,657,373

UNITED STATES PATENT OFFICE 2,657,373

APPARATUS FOR SEISMIC EXPLORATION

Raymond G. Piety, Bartlesville, Okla., assignor to Phillips Petroleum Company, a corporation of Delaware Application September 6, 1949, Serial No. 114,094

12 Claims. (Cl. 340—15)

This invention relates to a method of eliminating the effect of transverse waves, such as ground waves or body waves, in seismic exploration. In another aspect thereof, this invention relates to apparatus for recording translational movements of the earth from which components representative of ground roll or body waves are eliminated.

In seismic exploration, it is customary to fire an explosive charge at a shot point thereby to produce complex waves in the earth, part of which penetrate the ground to a considerable distance, are reflected from subterranean geological strata, and thereafter are propagated toward the surface of the earth. These reflected waves are of interest to geologists. When properly recorded, they enable the subterranean formations to be predicted with a considerable degree of accuracy. The recording of the waves is effected by a seismometer unit which converts the translational movement of the earth resulting from said reflected waves into electrical currents representative thereof, which electrical currents are used to actuate a recorder unit. However, certain of the waves caused by the explosion are propagated along the surface of the ground and such ground waves, usually referred to as Rayleigh waves, do not yield any information as to the nature of the subterranean strata. These ground waves have unwanted translational components which are picked up by the seismometer and recorded in the same manner as the reflected waves. This causes inaccuracies in the seismometer record and interferes with the proper evaluation of the waves reflected from subterranean strata.

Many attempts have been made to eliminate the effects of ground waves from the indications produced by a translational seismometer and many proposals have been made for accomplishing this result. In general, previous methods of eliminating ground waves have proceeded upon the assumption that the ground waves can be represented by a simple harmonic motion. This assumption leads to the prediction that each particle or area of the ground traversed by the wave would describe an elliptical path and that by resolving this elliptical motion into horizontal and vertical components, the effect of the surface wave can be eliminated. This method, as previously practiced, involves the use of translational seismometers to measure the horizontal and vertical components of ground roll and the addition of these components in such fashion as to eliminate the theoretical sinusoidal motion caused by the ground wave.

The movement of the ground is due to a surface wave which is often a wavelet of only a few cycles duration. The surface wave is described by the wave equation for elastic solids. Some inventors have devised ways for separating the effects of the surface waves from the reflected waves by methods based on a simple harmonic solution to the wave equation. This is a very rough approximation even in theory, when it is considered that the disturbance only lasts for a few cycles in most practical cases.

I have discovered that there is a definite relation between the rotational component of the surface wave and the translational or vertical component thereof. I have also discovered that the rotational component of the ground wave may be measured by a rotational seismometer and utilized to eliminate the translational component of ground roll from the output of a translational seismometer. Only the dilational or longitudinal component of the reflected waves is of interest in present day geophysical exploration. The rotational components are very weak compared to the components here considered, and hence, do not appreciably affect the result desired. Accordingly, the output of the rotational seismometer is substantially all due to the surface wave. This output may be utilized to balance out the translational component of the ground wave from the output of a translational seismometer which is responsive to both reflected and surface waves. Only the effect of reflected waves finally remains in the output of the system.

From the foregoing, it will be apparent that the effect of any wave having an undesired translational component, whether a ground wave or a body wave, whose direction of propagation is known, upon a translational wave can be eliminated by applying the principles of my invention.

It is an object of the invention to provide a method of and apparatus for measuring the disturbance due to reflected body waves without interference from surface or subsurface waves.

It is a further object of the invention to provide apparatus for accurately measuring waves reflected from beneath the surface of the earth and avoiding inaccuracies in the observation due to Rayleigh waves.

Various other objects, advantages and features of the invention will become apparent to those skilled in the art from the following detailed description taken in conjunction with the accompanying drawings, in which.

Figure 1:
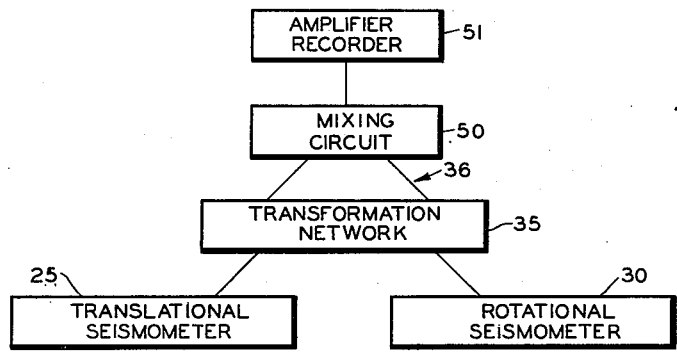
Figure 1 is a block diagram showing my novel seismometer apparatus.
Figure 2:
Figure 2 is a sketch illustrating the effect of the ground wave upon a rotational seismometer.

Referring now to Figure 2, wherein reference character 10 represents the surface of the ground, the firing of an explosive charge at the shot point 11 causes waves to be propagated through the earth which are measured by a seismometer 12. Part of the waves from the shot point 11 are propagated downwardly and reflected from subsurface strata to the seismometer 12 causing a vertical displacement thereof which yields valuable information concerning the structure of the earth. It is this translational component of the reflected waves which it is desired to measure by the seismometer 12. However, Rayleigh or surface waves of large magnitude compared to the reflected waves are also propagated from the shot point 11 to the seismometer 12, these waves having a translational component which also causes vertical movement of the seismometer 12 and interferes with proper measurement and analysis of the reflected waves. The Rayleigh or ground waves also have a rotational component which cause a rocking or rolling movement of seismometer 12 with the result that it may successively assume the positions indicated at 13 and 14 as the wave is propagated. It is an object of the invention to utilize this rotational ground roll component to eliminate the effect of the translational ground roll component upon the seismometer 12, thereby to permit accurate measurement of the reflected waves. The rotational component of any particular undesired wave, whether a surface or body wave, may also be used, in accordance with the invention, to neutralize the undesired vertical or translational component of such wave.

Figure 3:
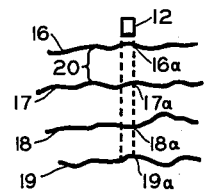
Figure 3 is a sketch illustrating the propagation of ground waves.

As will be apparent from Figure 2, the wave represented by the surface 10 or by a body wave is very complex and points on the surface do not move in a simple harmonic manner. However, the wave does, of course, conform to the wave equation for it is propagated through an elastic medium and, since the distance between the shot point 11 and seismometer 12 is quite large as compared with the wavelength, the ground waves reaching the seismometer 12 may be considered to be plane waves. This results from the fact that the curvature of the wave front is negligible over the area represented by the seismometer 12. Thus, referring to Figure 3, and assuming that the lines 16, 17, 18 and 19 represent successive wave fronts, there is little or no curvature thereof along the respective portions 16a, 17a, 18a, and 9a which are intercepted by the seismometer 12 although, of course, the wave fronts are actually of closed configuration and surround the shot point 11.

Since the surface or body waves conform to the wave equation, the vertical displacement ($z$) of the ground is a function of the distance ($x$) from an arbitrarily chosen point along the line connecting the shot point or direction of wave propagation and seismometer minus the product of time ($t$) and the constant velocity ($c$) of wave propagation. This is represented by the following equation:

$$z = f(x - ct)$$

Figure 4:
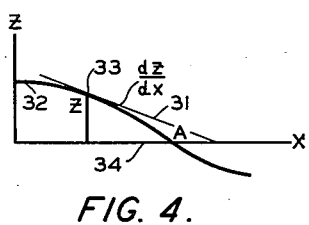
Figure 4 is a graph illustrating a feature of the invention.

Referring to Figure 4, wherein line 32 represents the surface of the earth, and point 33 represents a seismometer station a distance Z above a horizontal reference line 34, the translational component of an unwanted seismic wave may be represented by $$\frac{dz}{dt}$$

the rate of change of "$z$" with respect to time. Thus:

$$Ct = \frac{dz}{dt} = -cF'(x - ct)$$

where $ct$ is the translational component, "$d$" represents the operation of partial differentiation, and "$F'$" represents the derivative of "$F$" with respect to its argument. The angle A which for the angles encountered in seismic work is very small equals very closely the tangent of angle A, or $$\frac{dz}{dx}$$

the slope of tangent line 31. Thus:

$$Cr = A = \tan A = \frac{dz}{dx} = F'(x - ct)$$

where $Cr$ is the rotational component. Accordingly, the rotational component $Cr$ of any undesired surface or body wave is equal to $$-\frac{1}{c}$$

times the translational component of such wave. Evidently, therefore, the output of the rotational seismometer may be used to balance out the unwanted body or surface wave incident upon the translational seismometer.

In accordance with the invention, I provide a translational seismometer 25 whose output represents the same function of $$-\frac{1}{c}\frac{dz}{dt}$$

as the function of A represented by the output of a rotational seismometer 30. This is done either by the inherent characteristics of the seismometers or electrically in a transformation network 36, the outputs then being subtracted in a mixing circuit 50 which feeds a recorder 51.

As an example, if the output of seismometer 25 represents $$-\frac{1}{c}\frac{dz}{dt}$$

and the output of seismometer 30 represents A, then the voltages are subtracted directly in circuit 50, thus eliminating the unwanted component of the body or surface wave. If the output of seismometer 25 is the integral or derivative of $$-\frac{1}{c}\frac{dz}{dt}$$

then correspondingly, the output of seismometer 30 is the integral or derivative of A. The output $$-\frac{1}{c}\frac{dz}{dt}$$

may be produced from a seismometer having an output $$\frac{dz}{dt}$$

by the use of a suitable attenuating circuit in network 35 or by the use of a resistor in circuit with the seismometer. If the function produced by one seismometer varies with frequency, the function produced by the other must vary with frequency in a corresponding manner. This may be done advantageously by utilizing spring suspension type seismometers in which the moment of inertia, spring constant and dissipation constant of the rotational seismometer are identical with the total inertia, spring constant and dissipation constant, respectively, of the translational seismometer. The output of the translational seismometer provided it is of the moving coil dynamic type will then be proportional to the output of a displacement type rotational seismometer.

It will be noted that comparison of the seismometer outputs as by a cathode ray oscilloscope, affords a quick method of determining the velocity of seismic waves in the medium through which they are propagated, for the ratio of these quantities is the negative reciprocal of the velocity of the waves in this medium.

It will be noted that the functions represented by the outputs of the seismometers must be identical, over the frequency ranges of interest, for the above relationship to hold. It is commonly assumed that a seismometer represents a given function of the displacement produced by seismic waves incident thereon over its entire range. For example, seismometers are ordinarily classified as displacement, velocity, or acceleration types, and it is assumed that the output represents, say, velocity, over the entire operating range of seismic frequencies. In fact, however, the output may represent velocity only within a very limited frequency range. Outside this range, the response may represent acceleration, displacement, or various mixed functions of the seismic wave.

Figure 5:
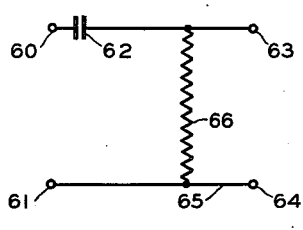
Figures 5, 6 and 7 are schematic circuit diagrams of electric transformation networks utilized by my invention.
Figure 6:
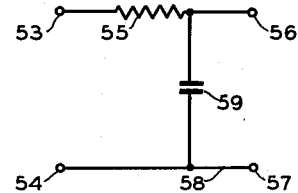
Figure 7:
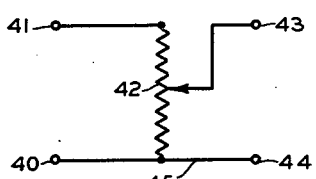

I have found that by adjusting the mass and spring constants of various parts of the seismometer, the functions of the translational and rotational seismometers, respectively, may be made identical over the entire frequency range, the adjustments being made empirically by adjusting the seismometer while noting its response to signals of preselected frequencies. Alternatively, the adjustments may be made electrically, by the use of integrating, differentiating, and attenuating circuits as illustrated in Figures 5, 6, and 7. When these functions are identical over the operating frequency range, the output of the rotational seismometer may be utilized to neutralize the translational component of an undesired surface or body wave, as previously set forth, leaving only the desired translational component in the altered output.

The method of this invention may be better understood by reference to examples in which the output of the seismometer is assumed to be a pure time derivative or integral of the seismic waves incident upon the seismometer. However, it will be understood that, in practice, the seismometer outputs do not represent pure time derivatives or integrals, and that they are adjusted, either electrically or mechanically so that the functions represented by the respective outputs of the translational and rotational seismometers are identical. The outputs of translational seismometers representing pure time derivatives are proportional to the following:

Displacement type $z = f(x-ct)$

Velocity type $\dfrac{dz}{dt} = -cf'(x-ct)$

Acceleration type $\dfrac{d^2z}{dt^2} = c_2 f''(x-ct)$

The displacement type rotational seismometer measures the slope of the ground upon which it is positioned, that is $$\frac{dz}{dx}$$

which in turn is equal to the tangent of angle A. Since the angular movement of the ground caused by the rolling wave is of a very small magnitude, the angle A is very small and, hence, is substantially equal to the tangent of angle A. Accordingly, the output of the displacement type rotational seismometer may be represented by the following expression:

$$A = \tan A = \frac{dz}{dx} = f'(x-ct)$$

The output of a velocity type rotational seismometer is, of course, proportional to the time derivative of the angle A which may be represented by the following expression:

$$\frac{DA}{Dt} = \frac{d}{dt}\frac{(dz)}{dx} = \frac{d^2z}{dtdx} = -cf''(x-ct)$$

Similarly, the output of an acceleration type rotational seismometer is proportional to the time derivative of the velocity type seismometer output or the second time derivative of the output of the displacement type seismometer, which may be represented by the following expression:

$$\frac{D^2A}{Dt^2} = \frac{d^3z}{dt^2 dx} = c^2 f'''(x-ct)$$

From comparison of the outputs of the rotational and translational seismometers, it will be noted that the output of the displacement type rotational seismometer is proportional to the output of the velocity type translational seismometer while the output of the velocity type rotational seismometer is proportional to the output of the acceleration type translational seismometer, the factor of proportionality being $$-\frac{1}{c}$$

in each case.

Similarly, the integral of the output of the rotational type displacement seismometer is proportional to the output of the displacement type translational seismometer, as will be apparent from the following expression:

$$\int A\, dA = \int \tan A\, d(\tan A) = \frac{-f(x-ct)}{c} + C$$

If the expression just given be considered to represent the first order of differentiation, then the output of the displacement type seismometer may be considered to be of the second order of differentiation, the output of the velocity type seismometer may be considered to be of the third order of differentiation, and the output of the acceleration type seismometer may be considered to be the fourth order of differentiation.

It will be apparent that the output of the rotational type seismometer is proportional to the translational component of ground roll or unwanted body waves provided that the translational component is a time derivative of the next higher order than the measured rotational component. Thus, it has previously been pointed out that the output of the velocity type translational seismometer (third order) is proportional to the output of the displacement type rotational seismometer (second order) while the output of the acceleration type translational seismometer (fourth order) is proportional to the output of the velocity type rotational seismometer (third order). It is also apparent that the relationship applies to higher and lower orders of differentiation since, if two quantities are proportional, their integrals and derivatives must be proportional.

Accordingly, when a rotational seismometer is subjected to a body wave or ground roll, which conforms to a solution of the wave equation, an electrical voltage is generated thereby which is proportional to the translational component of the ground roll of the next higher order of differentiation than the output of the rotational seismometer, the factor of proportionality $k$ being a function of the previously mentioned proportionality factor $$\frac{1}{c}$$

and the proportionality factor represented by the conversion of rotational movement into electrical voltage by the rotational seismometer. Since the rotational seismometer is affected only by the ground roll and not by the reflected waves, the electrical output of the rotational seismometer, when attenuated by some factor $k$, will be equal to the translational component of the next higher order of differentiation of the ground roll and can be used to eliminate the same from the output of a translational type seismometer.

As a specific example, assuming the translational seismometer 25 to be a velocity type seismometer and rotational seismometer 30 to be a displacement type seismometer, the output of the seismometer 30 is proportional to the translational component of the ground roll produced by seismometer 25 since the output of the translational seismometer (velocity) represents a time derivative of the next higher order than the output of the rotational seismometer (displacement). The output of rotational seismometer 30 is passed through a section 35 of a transformation network 36, this network including an attenuating circuit, such as shown by Figure 7. This network comprises input terminals 40, 41 which are shunted by a potentiometer 42, the tap of which is connected to an output terminal 43, the other output terminal 44 being connected to an input terminal 40 by a lead 45. The attenuator 42 is adjusted so as to reduce the magnitude of the output of the rotational seismometer 30 by the proportionality factor $k$ so that said output is equal to the voltage representing the translational component of ground roll which is produced by seismometer 25. The output of network section 35 is then fed to a mixing circuit 50 wherein it is subtracted from the output of translational seismometer 25, the resultant voltage being fed to an amplifier-recorder unit 51. This resultant voltage represents the translational components of the reflected waves from which the ground roll component has been eliminated by the novel circuits herein described.

The mixing circuit 50 may merely represent the attachment of the output terminals of translational seismometer 25 to the output terminals of network sections 35 or, in some cases, it may be desirable to use an electric resistance network of known design to prevent coupling between the circuits to be mixed. The amplifier-recorder 51 may be of any suitable type and usually is a recording oscillograph. The output voltage of the amplifier directs a spot of light on sensitized paper in the oscillograph so as to trace the wave motion of the earth as converted into electrical currents by the seismometers, transformation network, and mixing circuit.

An exactly similar operation occurs where rotational seismometer 30 is a velocity type seismometer and translational seismometer 35 is an acceleration type seismometer. It will be noted that the outputs of these seismometers resulting from the ground wave are proportional due to the fact that the translational seismometer measures a time derivative (acceleration) of the next higher order than the time derivative (velocity) measured by the rotational seismometer.

It is also within the scope of the invention to utilize seismometers of such types that the resulting outputs are not originally proportional, as hereinbefore described. In such cases, the transformation network 36 is then so adjusted as to electrically differentiate, integrate or otherwise transform as is understood in the communication art the seismometer outputs so as to provide the desired relationship before the voltages are fed to the mixing circuit 50. For example, if both seismometers 25 and 30 are of the displacement type, it is necessary to integrate the output of the rotational seismometer 30. The integrated voltage (representing the integral of displacement) is of the next lower order of differentiation and, hence, is proportional to the voltage (representing displacement) produced by the translational component of ground roll in seismometer 25. This result may be accomplished by including an integrating circuit in the transformation network section 35. Such an integrating circuit is disclosed by Figure 6 as including input terminals 53, and 54, the terminal 53 being connected through a resistance 55 to an output terminal 56, and input terminal 54 being directly connected to the other output terminal 57 by a lead 58.

The output terminals are shunted by a condenser 59 and the time constant of the resistance-capacitance unit 55, 59 is adjusted so that it is very large as compared to the duration of the incoming signals. A time constant of one-tenth second is suitable and this may be provided by utilizing a .1 megohm resistor and a 1 mfd. condenser. In the resulting circuit, the output of the rotational seismometer is integrated and then attenuated by the network shown in Figure 6 to provide a voltage which is equal to the voltage produced by the translational component of ground roll in the output of seismometer 25, these voltages being mixed in the circuit 50 so that the final voltage fed to the amplifier-recorder 51 is free from the effect of ground roll.

Similarly, if the translational seismometer 25 is an acceleration type seismometer and the rotational seismometer 30 is a displacement type seismometer, the output of seismometer 30 must be differentiated in order to provide a voltage (representing velocity) of the next higher order of differentiation and proportional to the voltage (representing acceleration) produced by seismometer 25 in response to the translational component of ground roll. To this end, the transformation network section 35 may include the differentiating circuit shown in Figure 5. This circuit comprises input terminals 60 and 61, the terminal 60 being connected through a condenser 62 to an output terminal 63, the other output terminal 64 being connected to input terminal 61 by a lead 65, and the output terminals 63, 64 being shunted by a resistor 66. In order to differentiate the voltages properly, the time constant of the resistance-capacitance unit 62, 66 should be small as compared with the length of the incoming signals. A time constant of .001 of a second is suitable and may be provided by utilizing a .01 megohm resistor and the .1 microfarad condenser.

It will be immediately apparent to those skilled in the art that other types of seismometers may be used at 25 and 30 with the provision of suitable differentiating and integrating circuits as previously described herein, the essential feature being that the transformed output of the rotational seismometer represents a time derivative of the next higher order than the time derivative represented by the output of the translational seismometer. In each case, it will be observed that the output of the translational seismometer is the same function of $$-\frac{1}{c}\frac{dz}{dx}$$

as the output function of the rotational seismometer is of the angle A. This relation is the essential basis of this invention. The results here described can be obtained even if the seismometers were not purely of the displacement or velocity or acceleration types but had a mixed output, the seismometers then being adjusted to secure identity between the functions over the whole operating range. The essential factor is that the wave form resulting from the same surface or body wave be related as described. Further, if desired, the integration or differentiation may be performed in the section 37 of transformation network 36 rather than in the section 35.

The apparatus and method of this invention produces an output at the recorder unit 51 which is not influenced by the body or surface waves proceeding from the shot point, only the reflected waves influencing the final output of the circuit. Further, the method and apparatus are adaptable for use in any type of earth strata since waves are propagated in all these strata in accordance with the fundamental wave equation.

While the invention has been described in connection with a present, preferred embodiment thereof, it is to be understood that this description is illustrative only and is not intended to limit the invention, the scope of which is defined by the appended claims.

What is claimed as new and desired to be secured by Letters Patent is:

I claim:

1. Apparatus for seismic exploration which comprises, in combination, means for generating a first electrical voltage representing a function of the derivative of translational earth movement with respect to time, means for generating a second voltage representing the same function of rotational earth movement, an electrical transformation network coupled to both generating means, said network being so constructed and arranged that one of said voltages is attenuated with respect to the other of said voltages, means for mixing said voltages to provide a resultant voltage, and means for measuring the resultant voltage.

2. Apparatus for seimic exploration which comprises, in combination, means for generating a first electrical voltage representing a function of the derivative of translational earth movement with respect to time, said voltage including a component of ground roll, means for generating a second voltage representing the same function of rotational earth movement due to said ground roll, an electrical transformation network coupled to both generating means, said network being so constructed and arranged that at the output thereof one of said voltages is attenuated with respect to the other of said voltages, means for mixing said voltages thereby to subtract the component of said unwanted wave from said first voltage, and means for measuring the resultant voltage which is representative of translational components of earth movement not resulting from said unwanted wave.

3. Apparatus for seismic exploration which comprises, in combination, means for generating a first electrical voltage representing a time derivative of translational earth movement, means for generating a second voltage representing a time derivative of rotational earth movement, an electrical network coupled to both generating means, said network being so constructed and arranged that at the output thereof said second voltage is representative of a time derivative of the next lower order than the time derivative represented by said first voltage and said second voltage is attenuated with respect to said said first voltage, means for mixing said voltages to provide a resultant voltage, and means for measuring the resultant voltage.

4. Apparatus for seismic exploration which comprises, in combination, means for generating a first electrical voltage representing the acceleration of translational earth movement, means for generating a second voltage representing a time derivative of preselected order of rotational earth movement, an electrical transformation network coupled to both generating means, said network being so constructed and arranged that at the output thereof the second voltage is attenuated and is representative of angular velocity, means for mixing the output voltage and the first voltage to provide a resultant voltage, and means for measuring the resultant voltage.

5. Apparatus for seismic exploration which comprises, in combination, means for generating a first electrical voltage representing the velocity of translational earth movement, means for generating a second voltage representing a time derivative of preselected order of rotational earth movement, an electrical transformation network coupled to both generating means, said network being so constructed and arranged that at the output thereof the second voltage is attenuated and is representative of angular displacement, means for mixing the output voltage and the first voltage to provide a resultant voltage, and means for measuring the resultant voltage.

6. Apparatus for seismic exploration which comprises, in combination, means for generating a first electrical voltage representing the translational displacement of the earth, means for generating a second voltage representing a time derivative of preselected order of rotational earth movement, an electrical transformation network, coupled to both generating means, said network being so constructed and arranged that at the output thereof the second voltage is attenuated and is representative of the integral of angular displacement, means for mixing the integrated voltage and the first voltage to provide a resultant voltage, and means for measuring the resultant voltage.

7. Apparatus for seismic exploration which eliminates the effect of gound roll from the output of a translational seismometer which comprises means for generating a first electrical voltage representing the velocity of translational earth movement, said voltage having a component resulting from ground roll, generating a second voltage representative of the rotational displacement of the earth due to ground roll, means for attenuating said second voltage so that it is equal to said component resulting from ground roll, means for mixing said first voltage and attenuated voltage to provide a resultant voltage, and means for measuring the resultant voltage.

8. Apparatus for seismic exploration which eliminates the effect of ground roll from the output of a translational seismometer which comprises means for generating a first electrical voltage representing the acceleration of translational earth movement, said voltage having a component resulting from ground roll, means for generating a second voltage representing the angular velocity of rotational earth movement due to ground roll, means for attenuating said second voltage so that it is equal to said component resulting from ground roll, means for mixing said first voltage and the attenuated voltage to provide a resultant voltage, and means for measuring the resultant voltage.

9. Apparatus for seismic exploration which comprises, in combination, means for generating a first electrical voltage representing the acceleration of translational earth movement, means for generating a second voltage representing angular displacement of the earth resulting from ground roll, means for differentiating said second voltage to provide a third voltage representative of angular velocity of the earth movement, means for attenuating said third voltage so that it is equal to the magnitude of the translational acceleration component resulting from ground roll, means for mixing said first voltage and said attenuated voltage to provide a resultant voltage, and means for measuring the resultant voltage.

10. Apparatus for seismic exploration which comprises, in combination, means for generating a first electrical voltage representing the velocity of translational earth movement, said voltage having a component resulting from ground roll, means for generating a second voltage representing angular velocity of the rotational earth movement due to ground roll, means for integrating said second voltage to provide a third voltage representing angular displacement due to ground roll, means for attenuating said third voltage so that it is equal to said translational component resulting from ground roll, means for mixing said first voltage and said attenuated voltage to provide a resultant voltage, and means for measuring the resultant voltage.

11. Apparatus for seismic exploration which comprises means for generating a first electrical voltage representative of translational displacement of the earth, said voltage including a component resulting from ground roll, means for generating a second voltage representing angular displacement of the earth due to ground roll, means for integrating the second voltage, means for adjusting the magnitude of said second voltage so that it is equal to said component resulting from ground roll, means for mixing the first voltage and the integrated voltage to provide a resultant voltage representative of earth displacement not resulting from ground roll, and means for measuring said resultant voltage.

12. Apparatus determining the velocity of wave propagation in an elastic medium which comprises means for generating a first electrical voltage representing a function of the derivative of translational movement with respect to time in said medium, means for generating a second electrical voltage representing the same function of rotational movement in said medium, and means for subtracting said voltages to produce a resultant voltage proportional to the negative reciprocal of the velocity of the measured waves in said medium.

RAYMOND G. PIETY.

References Cited in the file of this patent

UNITED STATES PATENTS

| Number | Name | Date |
|---|---|---|
| 2,184,313 | Owen | Dec. 26, 1939 |
| 2,257,187 | Owen | Sept. 30, 1941 |
| 2,272,984 | Ritzmann | Feb. 10, 1942 |
| 2,390,187 | Sharpe | Dec. 4, 1945 |

OTHER REFERENCES

A Study of Some Seismometers, Irland, pp. 11–14, Tech. Paper #556 U. S. Bureau of Mines, 1934.

Film Recording Seismograph, Electronics, May 1943, pp. 89–92.